Dec. 23, 1958     T. A. SAULNIER, JR     2,865,784
METHOD OF MANUFACTURING ELECTRON SENSITIVE MOSAIC SCREENS
Filed Aug. 31, 1954     2 Sheets-Sheet 1
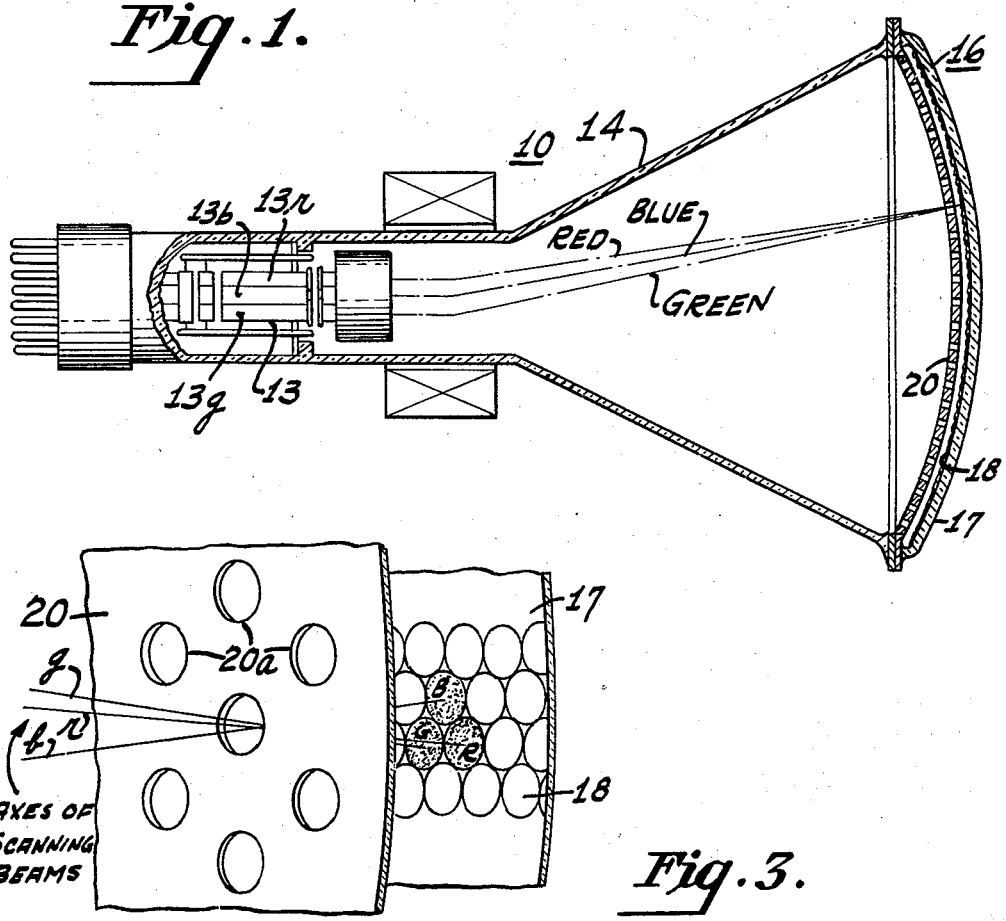
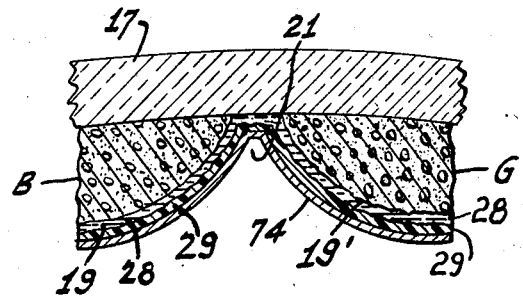
INVENTOR.
THEODORE A. SAULNIER, JR.
BY
ATTORNEY Dec. 23, 1958 T. A. SAULNIER, JR 2,865,784
METHOD OF MANUFACTURING ELECTRON SENSITIVE MOSAIC SCREENS
Filed Aug. 31, 1954 2 Sheets-Sheet 2

INVENTOR.
THEODORE A. SAULNIER, JR.
BY
William A. Zalesak
ATTORNEY ved method for producing a metal-backed phosphor screen.

2,865,784

METHOD OF MANUFACTURING ELECTRON SENSITIVE MOSAIC SCREENS

Theodore A. Saulnier, Jr., Lancaster, Pa., assignor to Radio Corporation of America, a corporation of Delaware Application August 31, 1954, Serial No. 453,285

3 Claims. (Cl. 117—33.5)

This invention relates to electron-sensitive phosphor screens and, in particular to tri-color phosphor screens and to a method of making such screens.

In certain types of cathode ray tubes using an electron beam for producing luminescence in a phosphor screen, it has proved advantageous to cover the phosphor target screen inside the tube with a thin, electron pervious, opaque metal screen. Such a metal screen provides a mirror surface to intensify the luminescent light of the phosphor screen. That is, light from the screen which tends to pass into the tube envelope and be lost to an observer, is reflected by the metallic film to intensify the useful light passing through the tube face. Other advantages are also obtained by the use of a metal backed phosphor screen. Without an opaque screen, light will normally go back into the tube, where it will not be completely absorbed by the conventional black second anode coating, so that some of the light is scattered back to the phosphor screen to light up dark areas. An opaque metal coating prevents all light from going back into the bulb and results in an improvement in contrast. Furthermore, the metal coating absorbs the negative ion component of the scanning electron beam and prevents its destructive bombardment of the phosphor screen. Also, the function of the metal film as a conductive coating, electrically connected to the second anode of the gun structure, improves resolution, as the target screen will not have to depend on its secondary emission characteristic to maintain potential at the point of focus. Also, phosphors which would not ordinarily be useful due to poor secondary emission properties can be used efficiently with a metal backing.

The metal film commonly used is an aluminum coating deposited on top of the phosphor screen. To produce good reflection, the surface of the aluminum film in contact with the phosphor screen should be of mirror smoothness. Due to the irregular matte surface presented by the phosphor crystals, certain special processes have been devised for forming a transparent organic film over the phosphor to provide a smooth foundation layer for the deposition of the aluminum coating.

One satisfactory method of providing the organic film foundation for the aluminum coating comprises, first providing a water cushion layer on the phosphor screen, spreading the organic film thereon and, by removing the water layer, depositing the film smoothly on the phosphor screen. Finally, the aluminum film is formed on the smooth organic film.

The foregoing method is generally satisfactory for phosphor screens comprising substantially a single, large body of phosphor material. However, problems arise in aluminizing tricolor phosphor screens or the like. Such screens generally comprise discrete elements, such as lines, dots or the like, of phosphor material disposed on a foundation or base plate with well-defined interstices between each element. The bare foundation plate is present in the interstices between the elements.

For one thing, the maximum efficiency of the aluminum film on such a screen is still not achieved and scattering of light persists due to the fact that an excess of water is present before the lacquer film is applied to the screen. In such a multi-element screen, the water layer fills the cavities between the individual phosphor elements and the lacquer film follows the contour of the water layer. Thus, the lacquer film does not enter the intersti es between the phosphor elements. Consequently, the metal film does not enter the interstices but bridges across said interstice and does not follow, in intimate contact, the entire contour of each phosphor element. When such a screen is energized by an electron beam, light emitted by the uncoated portion of each phosphor element is scattered through the bridging portions of the metal film and is lost and the efficiency of the screen is reduced.

It is, therefore, an object of this invention to provide an improved method for producing a metal-backed phosphor screen.

It is another object of this invention to provide an improved procedure for forming an organic film on the phosphor layer of a cathode ray tube screen prior to aluminizing of the screen.

It is also an object of this invention to provide an improved method of forming a mirror-smooth lacquer film covering the individual elements of a multi-color phosphor screen prior to the deposition of a metal coating thereon.

It is a further object of this invention to provide an improved method of forming an organic film on a phosphor surface by a relatively simple and rapid method.

And it is another object of my invention to provide an improved process for forming an organic film over a large-area matte surface.

In general, the principles and objects of this invention are accomplished in a phosphor screen including discrete phosphor elements, for example dots, positioned on a target surface by providing a very thin layer of water over the phosphor screen sufficient only to wet the exposed surface of each of the phosphor elements and to wet the portions of the target surface between them without filling the interstices between each element. This wetting may be achieved by spraying or otherwise providing an excess of water over the phosphor screen and then spinning the screen at relatively high speed to remove the excess water and thereby leave the desired thin film of water coating the phosphor crystals.

Alternatively, the desired degree of wetting may be achieved by cooling the screen to a suitably low temperature and then contacting the screen with air saturated with moisture whereby moisture condensation takes place on the screen.

After the screen has been thus appropriately wetted, a lacquer film is sprayed thereon by means of a device such as a fog nozzle which is liquid-operated rather than air-operated. Such a spraying operation provides the desired lacquer film on the phosphor screen without unduly drying portions of the screen. As the lacquer film dries, it forms a smooth intimate film over each phosphor element. Since the spaces between these elements are not filled with water the lacquer does not bridge across these spaces but follows closely the contour of each phosphor element. Finally, the desired metal film, for example of aluminum, is deposited on the lacquer-covered phosphor screen by an evaporation process whereby a smooth metallic coating covers substantially the entire exposed surface of each phosphor element and covers the portions of the target surface present between each of the elements. The screen is then processed to completion in the usual fashion.

The invention will be described in greater detail by reference to the following description taken in connection with the accompanying drawing, in which:

Fig. 1 is a partly diagrammatic longitudinal sectional view of a 3-gun tri-color kinescope of the shadow-mask dot-screen variety, the screen unit or target-assembly having a phosphor screen prepared in accordance with the principles of the invention;

Fig. 2 is a partly diagrammatic view in perspective of a portion of the face plate target assembly of the color-kinescope of Fig. 1 including a tri-color mosaic dot screen;

Fig. 3 is a partial sectional view of a cathode ray tube screen as viewed during its processing according to the invention;

Similar reference characters are applied to similar elements throughout the drawings.

Figure 4:
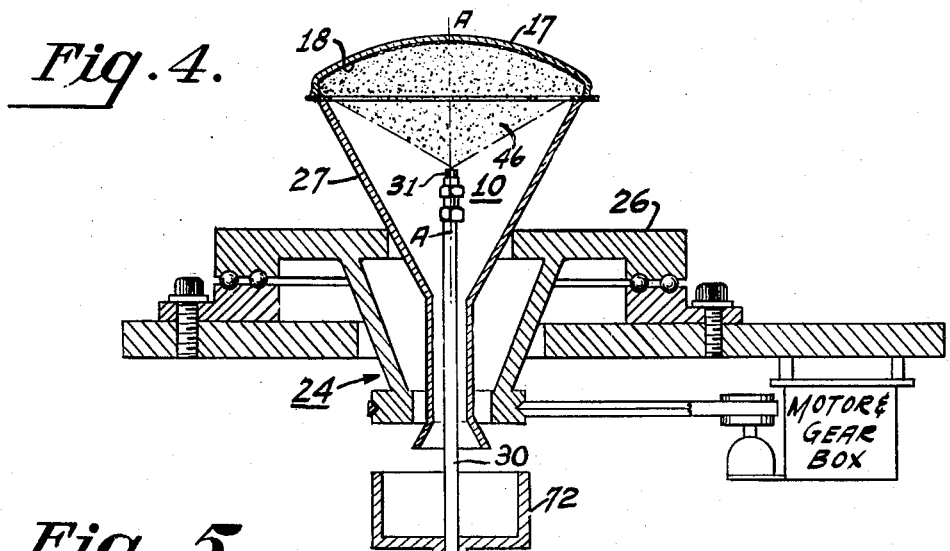
Fig. 4 is a sectional, elevational view of the face plate of Fig. 1 and a schematic drawing of apparatus for spray filming the same according to the invention.

Referring to Figure 1, the principles of the invention are applied to a cathode ray tube comprising an envelope 10 having a neck portion 12 in which a battery 13 of electron guns 13r, 13b, and 13g is mounted, a cone or shell 14 joined at one end to the neck portion 12, and a face plate assembly 16 closing the other end of the cone. The face plate assembly or target assembly includes a face plate 17 having a phosphor screen 18, in particular, a tri-color mosaic phosphor screen, on the inner surface thereof. The face plate 17 may be of any desired shape (e. g. circular or rectangular) and of any desired curvature (e. g. flat or spherical). In the instant case, it is in the form of a circular section of a spherical shell. Alternatively, as shown, for example, in U. S. Patent Number 2,595,548 to Schroeder, the color screen may comprise a flat glass plate independently mounted within the envelope 10 behind the face plate.

The face plate assembly 16 also includes an aperture mask 20 which may be made of perforated glass which has been metallized to render its surface conducting, or it may be formed of thin-metal or of any other conducting material which is non-reactive to the materials employed in laying down the pattern of phosphor dots on the surface of the face plate 17.

When, as in the instant case, the mosaic phosphor screen pattern is laid down directly on the surface of the curved face plate 17 of the tube envelope 10, the mask 20 is appropriately curved so as to be approximately concentric with the curved inner or target-surface of said plate.

The tri-color phosphor screen 18 is, preferably, of the kind comprising a multiplicity (say, 600,000) of systematically arranged phosphor dots, R (red), B (blue), G (green) formed on the face plate 17. The particular dot-pattern shown in Figure 2 is of the "hexagonal" variety disclosed in U. S. Patent 2,625,734 of H. B. Law. Here each dot, except those adjacent to the edge of the plate, is surrounded by six other dots.

In the use of such a phosphor screen, electrons from the three-cathodes of the electron gun pass through the apertures 20a in the mask 20 along separate angularly displaced paths, r, b, g to the different color phosphors R, B and G, respectively. It will be observed that, as in the Goldsmith (2,630,542) and Law (2,625,734) patents, the mask 20 contains one hole for each group of three phosphor dots.

The present invention is concerned with an improved method of providing an aluminum coating on the phosphor screen 18. After the desired arrays of phosphors R, B, and G, have been provided, the screen has the appearance indicated in Figure 3 wherein portions of adjacent blue-emitting and green-emitting phosphor dots are shown on a portion of the face plate 17. The irregular surface of the blue-emitting and green-emitting phosphor dots is represented by the reference characters 19 and 19', respectively, and the space between the dots is represented by the reference character 21.

In carrying the invention into effect and, to the end of providing a metallic coating on the phosphor screen 18, the screen is first moistened or wetted, for example with water. To effect the moistening operation an excess of water is poured or sprayed over the screen and then the face plate assembly is inverted and is spun at relatively high speeds to remove the excess moisture.

Referring to Figure 4, the spinning operation may be effected in a rotatable chuck 24 whose jaws 26 grip a support member 27 which simulates the shell of the completed tube and to which the face plate 17 is suitably clamped during spinning which may be performed at a speed in the range of 350 to 500 R. P. M.

At this point in the process, referring again to Figure 3, the exposed surfaces of the phosphor crystals are wetted by a thin layer of water 28 which follows closely the contour of the individual phosphor particles and the individual phosphor dots. However, the space 21 between the phosphor dots themselves is preferably not filled with water although the surface of the face plate 17 in the space 21 between the dots is also moistened or wetted.

The above-described wetting operation is performed, preferably, in an atmosphere having high relative humidity so that the screen will remain moist and not be dried during the spinning operation. In addition, it is also desirable, in order to prevent excessive evaporation of the screen during spinning, to chill the face plate to a temperature in the range of 0° C. to 20° C.

As an alternative method of wetting the phosphor screen, the desired film of moisture may be provided by means of a condensation process. By this method, the phosphor screen is cooled to a temperature in the range of 4° C. to 20° C. and brought into contact with air warmer than the screen and saturated with moisture. A barely perceptible coating of moisture is condensed on the screen and serves as a suitable moisture film for further processing of the screen.

Next, referring to Figure 3, a film of lacquer 29 is sprayed on the phosphor screen. Referring again to Figure 4, the apparatus for performing this operation includes a vertical pipe section or conduit 30 which extends within the support member 27. The vertical pipe section 30 is coincident with the longitudinal axis A of the member 27 and of the finally completed tube. A nozzle or mechanical atomizer 31 is attached to one end of the vertical pipe section 30 and the other end of the vertical pipe section is connected to a pressurized container or tank 32 through a lateral pipe section 34 having a solenoid control valve 36.

The tank 32 contains a quantity of lacquer spray solution 38 for forming the lacquer film 29. A high pressure air line 40 is connected to the tank 32, the air pressure being regulated by a valve 42 and indicated on a gauge 44. Air pressure is used solely to produce a flow of the lacquer solution 38 out of the tank 32 and into the nozzle 31 where it is mechanically atomized to produce within the substantially enclosed support member 27 a fine spray or mist 46 of lacquer which is directed onto the surface of the phosphor screen 18. No air comes out of the nozzle 31.

Prior methods of spray filming a lacquer material onto a phosphor screen preparatory to the application of a metal backing layer utilize a pneumatic-type spray gun which depends on air injection for atomizing the lacquer solution. The pneumatic-type spray gun has several disadvantages. In the first place, commercially available pneumatic guns provide a maximum spray angle of 90°. For filming large kinescopes, for example those having a diagonal length of 21 inches, a spray angle of 120° is desirable in order to obtain complete screen coverage.

In order to use a 90° spray angle pneumatic gun with large tubes, it has been necessary to mount the spray gun eccentrically with respect to the longitudinal axis of the bulb and to rotate the bulb to obtain wider coverage. Eccentric mounting of the gun, alone, however, is not sufficient to cover the outer surface areas of the phosphor screen. It is also necessary to spin the bulb to allow the lacquer film, while still fluid, to flow by centrifugal force to the outer surface areas.

Experience has shown that spinning of the bulb, when using a pneumatic-type spray gun, does not consistently give uniform and complete screen coverage. Thin lacquer filming at the edges is a frequent source of defects when the metal reflective layer is applied.

It was discovered that air injection used to atomize the lacquer solution is largely responsible for the thin filming at the edges. The stream of air gives rise to a turbulence within the enclosed bulb, causing the lacquer droplets to spin around excessively and partially dry either before they arrive at the screen or soon afterwards. The premature drying of the lacquer particles reduces their mobility and makes it difficult for the lacquer to flow and run and thus spread over the edge surface areas of the screen.

Another factor influencing the ability of the lacquer to flow and spread is the size of the lacquer droplets. It is desirable to use a very fine spray since the mobility of the lacquer particles increases with decrease in size. To obtain a finer spray with a pneumatic gun would require an increase in air pressure and in the volume of air flow which would result in increased drying of the particles.

These difficulties are overcome by employing mechanical atomization instead of air atomization of the lacquer solution. One type of nozzle which has been used successfully in carrying out this invention is a nozzle of the kind disclosed in U. S. Patent No. 2,621,078 to Wahlin, and known in the art as a fog nozzle.

Figure 5:
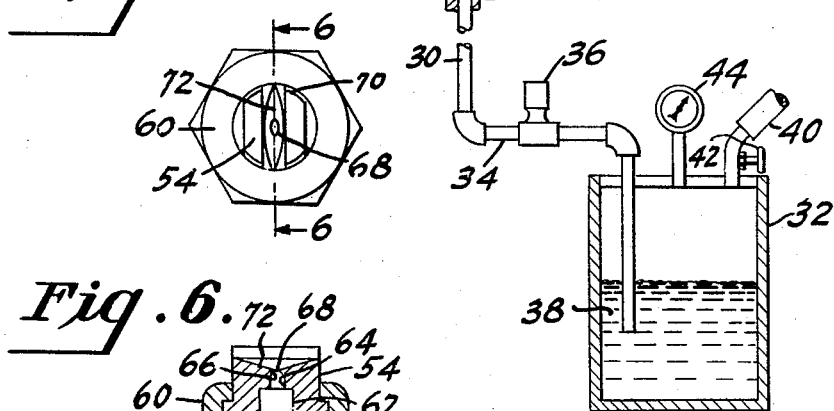
Fig. 5 is a top plan view of a nozzle for mechanically atomizing the filming solution according to the invention.
Figure 6:
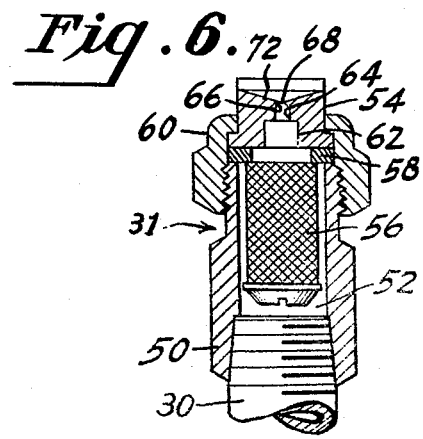
Fig. 6 is a longitudinal sectional view of the nozzle taken on line 5—5 of Fig. 5.

Referring to Figures 4 and 5, the fog nozzle 31 comprises a body 50 having a large cylindrical channel 52 therethrough. A flat sided nozzle tip 54 is secured to the outer end of the body 50 by a clamping member 60. A strainer 56 is fixed within the cylindrical channel 52 of the body 50. The strainer 56 has an annular flange 58 at the outer end thereof interposed between the nozzle tip 54 and the outer end of the body 50. The clamping member 60 by which the nozzle tip is secured to the body 50, thus holds the strainer within channel 52.

The nozzle tip 54 has a bored out cavity 62 communicating with the interior of the strainer 56 and leading to a relatively small diameter bore or passage 64 with a rounded or dome-shaped outer end 66 through which the spray orifice 68 is formed.

The orifice 68 is recessed in the end of the nozzle at the bottom of a channel or groove 70 which extends across the nozzle end, the channel 70 having a rounded bottom. A small V-groove 72 of the kind formed by a rotary cutter extends along the bottom of the channel 70 and a slight distance into the dome-shaped top 66 of the bore 64 to provide an orifice of the desired size and shape. In this case, the orifice 68 is long and narrow, providing a flat, wide angle spray.

It will be seen that atomization of the lacquer is dependent only on the mechanical construction of the nozzle and pressure applied to the lacquer. Hence, the term mechanical atomization is used to distinguish this type of atomization over the kind produced in a pneumatic gun, or air atomization.

The lacquer spray solution 38 is a mixture of a plastic or synthetic resinous material, which is insoluble in the water and is dissolved in a volatile solvent. One type of lacquer solution which has been successfully used in filming tubes according to the invention has the following formulation by weights:

| | Percent |
|---|---|
| Isobutylmethacrylate polymer | 5.7 |
| Acetyl peroxide (30% acetyl peroxide in dibutyl phthalate) | 0.1 |
| Toluene | 94.2 |

Referring to Figure 4, to provide the lacquer film 29, the face plate 17 is placed on the member 27 in the chuck 24 with the vertical pipe 30 extending within the member 27 and the nozzle 31 directed towards the phosphor screen 18. For a 21-inch tube, the spacing of the nozzle from the screen should be from 11 to 14 inches. With the air pressure in the tank 32 set at about 40 pounds per square inch for a nozzle having a capacity of 0.1 gallon per minute, the support member 27 is rotated in the chuck 24 at a speed of 60 R. P. M., and the solenoid valve 36 is opened to allow a flow of lacquer solution 38. The lacquer solution is mechanically atomized by the nozzle 31 into a fine mist or spray 46 of lacquer material.

Using a nozzle of the type described, a flat fan type spray having a spray angle of about 110° is achieved rather than a cone type spray. By rotating the chuck 24 and support member 27 while spraying, full 360° coverage of the phosphor screen 18 by the lacquer is obtained. Alternatively, the nozzle 31 may be rotated while keeping the support member 27 stationary.

Spraying is continued for about 5 to 15 seconds, depending on the size and shape of the bulb, after which time it is cut off automatically by the solenoid actuated valve 36. About 100 cc. of lacquer solution are used for a 27-inch tube. The bulb 10 is allowed to continue rotating for about 30 to 45 seconds to remove the excess lacquer to the sides of the bulb from where it is allowed to drip out from the tube neck 12 and into a drip pan 72.

When initially sprayed onto the phospor screen 18 and while still in a wet fluid state, the lacquer film 29 conforms to the surface irregularities of the dots of the phosphor screen 18 and closely follows the contour of the dots. After the spraying has been completed, the face plate 17 is removed from the chuck 24 and allowed to drain. The draining time is 20 minutes for 21 inch tubes. During this time, the lacquer film 29 partially hardens but generally follows the contour of the phosphor dots of the screen 18.

The face plate 17 is then dried with warm air (50° C. to 90° C.). The toluene first evaporates from the lacquer solution and the film 29 begins to shrink. As the lacquer film shrinks aided by the releasing action of the moisture film 28, it stretches smoothly across the surface of the individual phosphor particles and follows closely the contour of the phosphor dots into the interstices 21 between them without filling these openings and without bridging across these openings between the tops of adjacent dots. A few minutes later, the water film 28 evaporates through the film 29. When the drying is complete, the lacquer film is completely shrunk and stretches across the peaks of the phosphor particles in each phosphor dot as shown in Figure 3. In addition, the lacquer film follows the contour of the dots down into the interstices between the dots so that all of the surface of the phosphor dots is intimately covered. The surface of the lacquer film is then very smooth and hard and is ready for the application of the metal coating 74, preferably of aluminum. The thickness of the lacquer film may be in the range of 700 to 3000 Angstroms.

The aluminizing may be done by any known method of aluminizing cathode ray tube phosphor screens. Briefly, one method consists of fixing short lengths of aluminum wire to a tungsten filament, and heating the filament, in a vacuum, to a temperature sufficient to melt and evaporate the aluminum completely, and depositing the aluminum onto the smooth lacquer film 29 to form the aluminum layer 74.

The lacquer film 29 is baked later out at about 400° C. leaving only the aluminum layer 74 ahering to the phosphor screen 18.

The use of mechanical atomization rather than air atomization results in a number of advantages. In the first place, the absence of air allows the lacquer particles to arrive at the phosphor surface in a sufficiently fluid state so that subsequent rotation of the bulb permits the liquid lacquer particles to run together and spread evenly and uniformly over the entire phosphor surface. Thus, thin filming at the edges is avoided.

Secondly, the nozzle above-described intrinsically provides a wider angle spray, a spray angle of 110° as against 90° for commercially available pneumatic spray guns. A wide spray angle is desirable for filming large cathode ray tubes having a diagonal length of 21 inches or more, in order to obtain lacquer coverage of the phosphor at the edges without the necessity for relying wholly on the spinning operation.

Thirdly, the fog nozzle permits a finer spray than is possible with air atomization. A fine spray is desirable because it deposits a large number of closely spaced small droplets. Hence, during spinning of the bulb, their mobility is greater than that of larger droplets spaced relatively farther apart. To obtain a fine spray with air atomization would require an increase in air atomizing pressure and in the volume of air flow, resulting in increased drying of the particles, a result which has already been described as being detrimental.

Fourthly, the use of mechanical atomization is advantageous for lacquer spraying when very thin films of water are to be coated with lacquer as in the instant case. If air atomization of the lacquer is employed, the small quantity of water wetting the screen is evaporated from some areas before the lacquer is applied thereto.

What is claimed is:

1. The method of coating phosphor screen comprising an array of phosphor elements disposed on a base plate and having well-defined interstices between said elements comprising the steps of applying minute droplets of water to said screen to form a thin film of water in intimate contact with substantially the entire surface of each of said elements without filling said interstices, providing a thin film of an organic resinous material in intimate contact with substantially the entire surface of each of said elements without filling said interstices therewith and without bridging across said interstices, coating a film of metal on said resinous material and in intimate contact therewith, and removing said resinous material.

2. The method of coating a phosphor screen comprising an array of phosphor elements disposed on a base plate and having well-defined interstices between said elements, comprising the steps of cooling said screen, contacting said cooled screen with air saturated with moisture and warmer than said screen such that a thin film of water is deposited on substantially the entire surface of each of said elements without filling the interstices between said elements, coating substantially the entire surface of each of said elements with an organic resinous material without filling said interstices therewith and without bridging across said interstices, coating a film of metal on said resinous material and thereafter vaporizing said resinous material.

3. The method of coating a phosphor screen comprising an array of spaced deposits of phosphor material on a supporting plate having well-defined interstices between said spaced deposits, said method comprising the steps of providing a thin film of water on substantially the entire exposed surface of each of said deposits of phosphor material and in contact with the portions of the surface of said plate present in said interstices without filling said interstices, depositing over the whole surface of said water film a continuous film of an organic resinous material without filling the interstices between said phosphor deposits therewith and without bridging across said interstices, coating a film of metal on said resinous material, and thereafter baking out said resinous material.

No references cited.